(12) United States Patent
Smith et al.

US007097705B2

(10) Patent No.: US 7,097,705 B2
(45) Date of Patent: Aug. 29, 2006

(54) CATIONIC-ANIONIC BLENDS FOR DYNAMIC SURFACE TENSION REDUCTION

(75) Inventors: Carrington Duane Smith, Slatington, PA (US); Evelyn Jennifer Lin Paulsen, Macungie, PA (US); Peng Zhang, Whitehall, PA (US); Robert Krantz Pinschmidt, Jr., Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 95 days.

(21) Appl. No.: 10/112,537

(22) Filed: Mar. 29, 2002

(65) Prior Publication Data

US 2003/0032698 A1 Feb. 13, 2003

Related U.S. Application Data

(63) Continuation-in-part of application No. 09/659,856, filed on Sep. 11, 2000, now abandoned.

(51) Int. Cl.
*C09K 3/00* (2006.01)
*C09K 101/00* (2006.01)
*C08K 5/17* (2006.01)
*C08K 5/3462* (2006.01)
*C09D 11/10* (2006.01)

(52) U.S. Cl. .................. 106/287.3; 524/186; 524/236; 523/160

(58) Field of Classification Search ................ 523/160, 523/161; 106/31.6, 31.89; 524/106, 127, 524/157, 186, 236
See application file for complete search history.

(56) References Cited

U.S. PATENT DOCUMENTS

| | | | | |
|---|---|---|---|---|
| 2,267,205 A * | 12/1941 | Kyrides | ........................ | 510/276 |
| 2,772,174 A | 11/1956 | Riegler et al. | ................. | 106/14 |
| 2,852,406 A | 9/1958 | Riegler et al. | ............... | 106/304 |
| 3,186,828 A | 6/1965 | Baarson et al. | ................. | 71/64 |
| 3,468,804 A | 9/1969 | Perry | .......................... | 252/143 |
| 3,755,244 A * | 8/1973 | Hart | ........................... | 523/333 |
| 4,094,664 A * | 6/1978 | Thomas | ....................... | 504/322 |
| 4,330,526 A | 5/1982 | Watanabe et al. | ............. | 424/70 |
| 4,527,421 A * | 7/1985 | Miller, Jr. | ................... | 73/64.51 |
| 4,888,119 A | 12/1989 | Klewsaat | ..................... | 252/8.75 |
| 4,919,839 A | 4/1990 | Durbut et al. | ............... | 252/153 |
| 5,055,506 A * | 10/1991 | Knutson | ...................... | 524/100 |
| 5,108,488 A * | 4/1992 | Etheridge | ..................... | 504/130 |
| 5,403,358 A | 4/1995 | Aston et al. | .................... | 8/445 |
| 5,441,541 A | 8/1995 | Mehreteab et al. | ............ | 8/137 |
| 5,679,724 A | 10/1997 | Sacripante et al. | ......... | 523/161 |
| 5,720,800 A | 2/1998 | Matsumoto | .................... | 106/2 |
| 5,804,640 A * | 9/1998 | Laura et al. | ................ | 524/507 |
| 5,837,041 A * | 11/1998 | Bean et al. | ................. | 106/31.6 |
| 5,939,358 A | 8/1999 | Hester | ........................ | 504/360 |
| 5,939,476 A | 8/1999 | Lassila et al. | ............... | 524/251 |
| 6,010,996 A | 1/2000 | Hu et al. | ...................... | 510/384 |
| 6,015,852 A | 1/2000 | Lassila et al. | ............... | 524/251 |
| 6,051,056 A | 4/2000 | Lassila et al. | ............ | 106/31.28 |
| 6,103,388 A | 8/2000 | Babcock et al. | ............ | 428/484 |
| 6,120,589 A | 9/2000 | Bannai et al. | ............ | 106/31.27 |
| 6,190,733 B1 | 2/2001 | Lassila et al. | ............... | 427/256 |
| 6,231,652 B1 | 5/2001 | Koyano et al. | ........... | 106/31.27 |
| 6,235,820 B1 | 5/2001 | Lassila et al. | ............... | 524/100 |

FOREIGN PATENT DOCUMENTS

| EP | 251621 A2 * | 1/1988 |
|---|---|---|
| EP | 943663 A1 * | 9/1999 |
| GB | 2160886 A * | 1/1986 |

OTHER PUBLICATIONS

Schwartz, J. "The Importance of Low Dynamic Surface Tension in Waterborne Coatings", Journal of Coatings Technology, Sep. 1992.
Wirth, W.; Storp, S.; Jacobsen, W. "Mechanisms Controlling Leaf Retention of Agricultural Spray Solultions", Pestic. Sci. 1991, 33, 411-420.
Medina, S.W.; Sutovich, M. N. , "Using Surfactants to Formulate VOC Compliant Waterbased Inks", Am. Ink Maker 1994, 72 (2), 32-38.
Khan, A.; Marques E. "Cationic Surfactants" Specialist Surfactants, published by Blackie Academic and Professional, London, pp. 37-80 (1997).
Mehreteab, A., "Anionic-Cationic Surfactant Mixtures", Surfactant Sci. Ser., 82 (Handbood of Detergents, Part A), 133-155 (1999).
Mehreteab, A., "Effects of Structure on the Properties of Pseudononionic Complexes of Anionic and Cationic Surfactants" ACS Symp. Ser. 501 (Mixed Surfactant Systems) pp. 402-415 (1992).
Joos, P.; Van Hunsel, J.; Bleys, G., "Dynamic Surface Properties of Anionic-Cationic Mixtures", J. Phys. Chem. 90, pp. 3386-3393 (1986).
Zhang, L-H; Zhao, G-X, "Dynamic Surface Tension of the Aqueous Solutions of Cationic-Anionic Surfactant Mixtures", J. Colloid and Interface Sci., 127 (2) 353-361 (1989).
Rosen, M. J. and Gao, T., "Dynamic Surface Tension of Aqueous Surfactant Solutions: 5. Mixtures of Different Charge Type Surfactants", J. Calloid Interface Sci. , 173, 42-48 (1995).
Mysels, K. J., "Improvements in the Maximum-Bubble-Pressure Method of Measuring Surface Tension," Chemistry Dept., University of California San Diego, La Jolla, California (1986).
Zhu, B. Y., et al., "Study on Reversed Microemulsion and Reversed Micelle in Catanionic Surfactant System," ACTA Chimica Sinica, vol. 59, No. 6, pp. 913-917 (2001). (Abstract).

* cited by examiner

*Primary Examiner*—Callie Shosho
(74) *Attorney, Agent, or Firm*—Michael Leach

(57) ABSTRACT

This invention provides water-based compositions, particularly coating, ink, adhesive, fountain solution and agricultural compositions, manifesting reduced equilibrium and dynamic surface tension by the incorporation of a surface tension reducing amount of a mixture of a non-fluorinated anionic compound and a non-fluorinated weak base cationic compound, the mixture demonstrating a dynamic surface tension (DST) which is less than the DST of the individual anionic and cationic compounds and less than 45 dynes/cm, at a concentration of ≦5 wt % in water at 23° C. and 20 bubbles/second or less than 40 dynes/cm at a concentration of ≦0.03M in water at 23° C. and 0.1 bubbles/second according to the maximum-bubble pressure method.

25 Claims, No Drawings

CATIONIC-ANIONIC BLENDS FOR DYNAMIC SURFACE TENSION REDUCTION

CROSS-REFERENCE TO RELATED APPLICATIONS

The present application is a continuation-in-part of application Ser. No. 09/659,856 filed 11 Sep. 2000, now abandoned which is hereby incorporated by reference.

FIELD OF THE INVENTION

The invention relates to the use of cationic-anionic compositions to reduce the surface tension in water-based systems.

BACKGROUND OF THE INVENTION

The ability to reduce the surface tension of water is of great importance in waterborne coatings, inks, adhesives, fountain solutions, agricultural formulations, and other industrially important formulations because decreased surface tension translates to enhanced substrate wetting in actual formulations. Surface tension reduction in water-based systems is generally achieved through the addition of surfactants. Performance attributes resulting from the addition of surfactants include enhanced surface coverage, fewer defects, and more uniform distribution. Equilibrium surface tension (EST) performance is important when the system is at rest. However, the ability to reduce surface tension under dynamic conditions is of great importance in applications where high surface creation rates are utilized. Such applications include spraying, rolling and brushing of coatings or spraying of agricultural formulations, or high speed gravure or ink-jet printing. Dynamic surface tension (DST) is a fundamental quantity which provides a measure of the ability of a surfactant to reduce surface tension and provide wetting under such high speed application conditions.

Traditional nonionic surfactants such as alkylphenol or alcohol ethoxylates, and ethylene oxide (EO)/propylene oxide (PO) copolymers have excellent equilibrium surface tension performance but are generally characterized as having poor dynamic surface tension reduction. In contrast, certain anionic surfactants such as sodium dialkyl sulfosuccinates can provide good dynamic results, but these are very foamy and impart water sensitivity to the finished coating.

There is a need for surfactants which exhibit good equilibrium and especially good dynamic surface tension properties, are preferably low-foaming, and would be widely accepted in the waterborne coating, ink, adhesive, fountain solution and agricultural formulation industries.

The importance of reducing equilibrium and dynamic surface tension in applications such as coatings, inks, adhesives, fountain solutions and agricultural formulations is well-appreciated in the art as taught in the following documents:

Schwartz, J. "*The Importance of Low Dynamic Surface Tension in Waterborne Coatings*", Journal of Coatings Technology, September 1992;

Wirth, W.; Storp, S.; Jacobsen, W. "*Mechanisms Controlling Leaf Retention of Agricultural Spray Solutions*"; Pestic. Sci. 1991, 33, 411–420; and Medina, S. W.; Sutovich, M. N. "*Using Surfactants to Formulate VOC Compliant Waterbased Inks*", Am. Ink Maker 1994, 72 (2), 32–38.

Extensive background literature exists for the measurement of low equilibrium surface tension of anionic-cationic surfactant mixtures. See "Catanionic Surfactants," A. Khan and E. Marques in *Specialist Surfactants*, Published by Blackie Academic and Professional, London, pp. 37–80 (1997) and "Anionic-Cationic Surfactant Mixtures," A. Mehreteab, Surfactant Sci. Ser., 82 (Handbook of Detergents, Part A), 133–155 (1999) for reviews.

Several patents describe applications of such anionic-cationic surfactant mixtures in detergents or shampoos, namely, U.S. Pat. Nos. 4,330,526; 4,888,119; 4,919,839; and 5,441,541. A recent patent, U.S. Pat. No. 6,010,996 describes the use of anionic-cationic surfactant mixtures of strong acid anionic/permanent quaternary cationic surfactants as biocides and surface tension reducers with good performance under dynamic conditions.

In "Effects of Structure on the Properties of Pseudononionic Complexes of Anionic and Cationic Surfactants", A. Mehreteab in ACS Symp. Ser. 501 (Mixed Surfactant Systems) pp. 402–415 (1992), a description of lowering of dynamic surface tension (DST) by "pseudononionic" ethoxylated cationic-anionic surfactant blends was given, but DST were still high at >45 dyne/cm at 4 bubbles/sec.

In "Dynamic Surface Properties of Anionic-Cationic Mixtures", P. Joos, J. Van Hunsel and G. Bleys, J. Phys. Chem., 90, pp. 3386–3393 (1986), some theoretical support is given that dynamic surface tension of these mixtures should be dependent on diffusion characteristics of either the two individual surfactant diffusion coefficients, which in most cases will reduce to the diffusion coefficient of the electroneutral complex.

In "Dynamic Surface Tension of the Aqueous Solutions of Cationic-Anionic Surfactant Mixtures", L. -H. Zhang and G. -X. Zhao, J. Colloid and Interface Sci., 127 (2), 353–361 (1989), the authors describe DST reduction by anionic-cationic surfactant blends in which the only examples of complexes having DST<40 dynes/cm were fluorinated surfactants.

Finally, in "Dynamic Surface Tension of Aqueous Surfactant Solutions: 5. Mixtures of Different Charge Type Surfactants", M. J. Rosen and T. Gao, J. Colloid Interface Sci., 173, 42–48 (1995), the authors describe anionic-cationic surfactant mixtures which have higher DST than the individual parent surfactants. The authors state that "{in anionic-cationic surfactant blends}, the strong interaction of the two components to produce a bulkier, more hydrophobic, tight ion pair containing two hydrophobic groups results in a reduction of the rate of diffusion of the surfactant in the mixtures to the interface and a consequent increase in the surface tension at short times (log t<0)." The authors go on to state that "at short times (log t<0), because of the interaction of the two components, the {dynamic} surface tension of the mixtures is again greater than that of either component by itself."

In all of the above citations reference is made to the use of permanent quaternary ($R_4N^+X^-$) cationic surfactants. There is no consideration of weak base amine ($R_3N$) compounds which can reversibly protonate to $R_3NH^+X^-$ cationic species.

A number of patents have appeared on alkyl, hydroxyalkyl and hydroxyalkylether substituted weak base mono-di-, tri- and higher amine based surfactants. These include U.S. Pat. No. 6,235,820 alkylated aminoalkylpiperazine surfactants; U.S. Pat. Nos. 6,190,733; 6,051,056; alkylated aminoether surfactants; U.S. Pat. Nos. 6,015,852 and 5,939,476 surface tension reduction with alkylated higher polyamines.

Copending applications describing amine/glycidyl ether adducts for use as foam reducing components include "Alkyl Glycidyl Ether-Capped Polyamine Foam Control Agents", Ser. No. 09/909,555 filed 20 Jul. 2001 and "Alkyl Glycidyl Ether-Capped Diamine Foam Controlling Agents", Ser. No. 10/061,898 filed 1 Feb. 2002.

SUMMARY OF THE INVENTION

This invention provides water-based compositions containing an organic or inorganic compound, particularly aqueous protective or decorative organic coating, ink, adhesive, fountain solution and agricultural compositions, having reduced equilibrium and dynamic surface tension by incorporation of an effective amount of a mixture of an anionic compound and a weak base amine cationic compound, preferably both the anionic and cationic compounds are non-fluorinated. An effective amount of the mixture is used such that the mixture demonstrates a dynamic surface tension (DST) which is less than that of the DST of the individual anionic and cationic compounds, and preferably a DST which is either less than 45 dynes/cm at a concentration of $\leq 5$ wt % in water at 23° C. and 20 bubbles/second or less than 40 dynes/cm at a concentration of $\leq 0.03$M in water at 23° C. and 0.1 bubbles/second according to the maximum-bubble pressure method. The maximum-bubble pressure method of measuring dynamic surface tension (DST) is described in *Langmuir* 1986, 2, 428–432, which is incorporated by reference. Typically, either the anionic or the weak base cationic compound of the mixture is itself a surfactant. Such mixtures of an anionic compound and a weak base amine cationic compound will also be referred to as "catanionic" mixtures, compositions or blends.

By "weak base" we mean a basic material having a $pK_a$ less than 11.5 and is not ammonia ($NH_3$) or an ammonium ($NH_4+$) compound.

By "water-based", "aqueous" or "aqueous medium" we mean, for purposes of this invention, a solvent or liquid dispersing medium which comprises at least 90 wt %, preferably at least 95 wt %, water. Obviously, an all water medium is also included.

Also provided is a method for lowering the equilibrium and dynamic surface tension of such aqueous compositions by the incorporation of these mixtures of weak base cationic and anionic compounds.

Also provided is a method for applying a coating of a water-based inorganic or organic compound-containing composition to a surface to coat, partially or fully, the surface with the water-based composition and optionally evaporating the aqueous medium yielding a coating of the inorganic or organic compound, the water-based composition containing an effective amount of a catanionic mixture for reducing the dynamic surface tension of the water-based composition.

Surfactant materials which may be used as the anionic component include organic sulfates, sulfonates, phosphates or carboxylates. Other non-surfactant anionic organic materials containing these groups (such as sodium xylene sulfonate) may be utilized to lower the EST or DST of a weak base cationic surfactant as well.

Surfactant materials which may be used as the weak base cationic component include amines, imidazoles and pyridines. Other non-surfactant weak base cationic organic materials containing these groups (such as trimethylamine) may be utilized to lower the DST of an anionic surfactant as well.

For purposes of this invention "surfactant" means a material that lowers the surface tension of water.

There are significant advantages associated with the use of these catanionic compositions in water-based organic coatings, inks, adhesives, fountain solutions and agricultural compositions and these advantages include:

an ability to formulate water-borne coatings, inks, adhesives, fountain solutions and agricultural compositions which may be applied to a variety of substrates with excellent wetting of substrate surfaces including contaminated and low energy surfaces;

an ability to provide a reduction in coating or printing defects such as orange peel and flow/leveling deficiencies;

an ability to formulate water-borne coating and ink compositions capable of high speed application;

an ability to produce low-foam surfactants capable of reducing dynamic surface tension; and an ability to produce water-borne coatings and inks which have low volatile organic content, thus making these formulations environmentally favorable.

Because of their excellent surfactant properties and optional low foaming characteristics, these materials are likely to find use in many applications in which reduction in dynamic and equilibrium surface tension and low foam are important. Applications in which low foam is important include various wet-processing textile operations, such as dyeing of fibers, fiber souring, and kier boiling, where low-foaming properties would be particularly advantageous; they may also have applicability in soaps, water-based perfumes, shampoos, and various detergents where their marked ability to lower surface tension while simultaneously producing substantially no foam would be highly desirable.

DETAILED DESCRIPTION OF THE INVENTION

This invention relates to the use of a mixture of an anionic compound and a weak base amine cationic compound, provided that at least one is a surfactant material, preferably both the anionic and the weak base amine cationic compounds are surfactant materials. The mixture demonstrates a dynamic surface tension (DST) which is less than the DST of either of the anionic compound or cationic compound individually and which preferably is less than 45 dynes/cm at a concentration of $\leq 5$ wt % in water at 23° C. and 20 bubbles/second or less than 40 dynes/cm at a concentration of $\leq 0.03$M in water at 23° C. and 0.1 bubbles/second according to the maximum-bubble pressure method. It is especially desirable that an aqueous solution of the catanionic mixture demonstrates a dynamic surface tension of less than 35 dynes/cm at a concentration of $\leq 5$ wt % in water at 23° C. and 20 bubbles/second or less than 40 dynes/cm at a concentration of $\leq 0.0015$M in water at 23° C. and 0.1 bubbles/second according to the maximum-bubble pressure method.

These catanionic mixtures suitably reduce the equilibrium and dynamic surface tension in water-based compositions containing an organic compound, particularly protective or decorative coating, ink, fountain solution, adhesive and agricultural compositions containing organic compounds such as polymeric resins, herbicides, fungicides, insecticides or plant growth modifying agents.

In one aspect of the invention the catanionic compositions display excellent ability to reduce equilibrium and dynamic surface tension while producing substantially no foam.

As described in the prior art literature, the structural features of the anionic and weak base cationic compounds affect the solubility of the resulting mixture, as does the stoichiometric ratio of the two compounds. Therefore, the mixtures must have sufficient solubility in water at 23° C. such that static and dynamic surface tension reduction is achieved, preferably to <45 dynes/cm at a concentration of ≦5 wt % and 20 bubbles/second or less than 40 dynes/cm at a concentration of ≦0.03M in water at 23° C. and 0.1 bubbles/second is achieved. Examples of several structural features, stoichiometric ratios, and pH effects will be provided in the following examples. Prior art cationic materials are strong base ammonium and phosphonium compounds which contain a permanent positive charge even at elevated pH. Examples of such structures include:

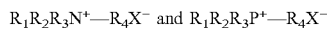

The term "strong base" arises from the fact that $X^-$ may be $OH^-$ without losing the positive charge on the cationic component. Weak base amine cationic compounds contain primary, secondary, or tertiary amines which are only cationic when protonated. The extent of protonation as a function of pH is expressed by the $pK_a=14-pK_b$, where, $K_b=K_{water}/K_a=[OH][RR'R''NH^+]/[RR'R''N]$ $K_{water}=[H^+][OH]/[H_2O]=1.01\times10^{-14}$ at 25° C.

These can be combined and rearranged to $K_a=K_{water}/K_b=[H^+][RR'R''N]/[H_2O][RR'R''NH^+]$ Suitable weak base cationic materials for use in the invention basic manifest a pKa less than 11.5, preferably less than 11.25 and most advantageously less than 11.

Preferably, the useful equivalents ratios of the weak base cationic material to anionic material are in the range of 10:1 to 1:6, more preferably 3:1 to 1:2, and most desirably 1:1.

Weak base cationic and anionic surfactants which may be suitable for use in preparing the catanionic mixtures include those surfactants disclosed in "McCutcheon's Emulsifiers & Detergents", North American Edition 1999. Suitability may be easily determined by mixing appropriate ratios of anionic and weak base cationic compounds to determine the solubility of the pairs in water, optionally adjusting the pH with a strong acid to protonate the weak base amine. If soluble to an appreciable level to lower DST, the dynamic surface tension and foaming of the aqueous solutions may be determined by standard methods.

Suitable weak base cationic surfactants which may be used include amines, such as primary, secondary and tertiary monoamines, diamines, triamines and tetramines, and imidazoles and pyridines. Amines are typically higher alkyl, hydroxyalkyl, alkoxyalkyl or hydroxyalkoxyalkyl amines in which the alkyl portions have from 5 to 50 carbon atoms, where the ratio of carbon atoms to nitrogen plus ether and hydroxy oxygen atoms, i.e., (C:N+O), is 2:1 to 10:1, and preferably 2.5:1 to 7:1. The nitrogens in these materials may be either mono-, di-, or tri- substituted amines. Two classes of weak base amine are represented by the formulas:

$R_1R_2N-R_3$ $R_1R_2N-R'_1-NR_3R_4$ where $R_1$ is C4–18 alkyl, hydroxyalkyl, alkoxyalkyl or hydroxyalkoxyalkyl, and each of $R_2$, $R_3$, and $R_4$ is independently H, C1–10 alkyl, C1–10 hydroxyalkyl, C1–10 hydroxy-alkoxyalkyl, benzyl or $-(C_2H_4O)_nH$ where n has a value from 1 to 14, and not more than one of $R_2$, $R_3$, and $R_4$ is benzyl, and $R'_1$ is a linking chain of 2–6 carbons, 2–6 carbons and an ether oxygen, or is two linking chains, such that $N-R'_1-N$ is a piperazine ring.

Another class includes certain alkylated tri- and tetramines of the general formula

where $R'_1$, $R_1$, $R_2$, $R_3$, and $R_4$ are as above, $R'_2$ is a C2–3 chain, r is 1–2 and $R_5$ is H, C1–10 alkyl, C1–10 hydroxyalkyl, C1–10 hydroxyalkoxyalkyl, benzyl or $-(C_2H_4O)_nH$ where n has a value from 1 to 14, and not more than one of $R_2$, $R_3$, $R_4$ and $R_5$ is benzyl.

Another class includes certain alkylated aminoether compounds of the formula $R_6-HN(CH_2)_2[O(CH_2)_n]_mO(CH_2)_qNH-R_7$ where n is 2–6, m is 0–4, and p and q are 2–6, and $R_6$ and $R_7$ independently are an alkyl group comprising 5 to 18 carbons, preferably which is branched or in which the point of attachment to nitrogen is on a nonterminal carbon.

Another class includes certain aminoethylpiperazine compounds in which the primary and secondary amines may be independently substituted with 1–3 linear or preferably branched C1–8 alkyl groups.

Using weak base amines with branched structures, especially branched alkyl groups, in the catanionic mixtures affords lower foaming, and often substantially no foaming.

Some specific examples of weak base amines include the compounds shown below:

CATIONIC STRUCTURES

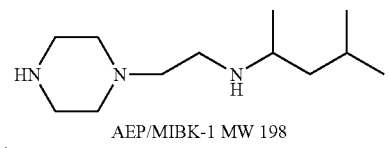

AEP/MIBK-1 MW 198

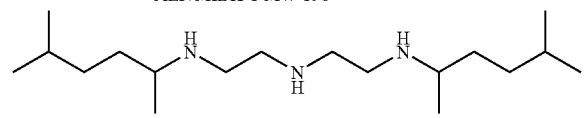

DETA/MIAK-2 MW 296

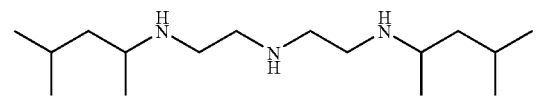

DETA/MIBK-2 MW 268

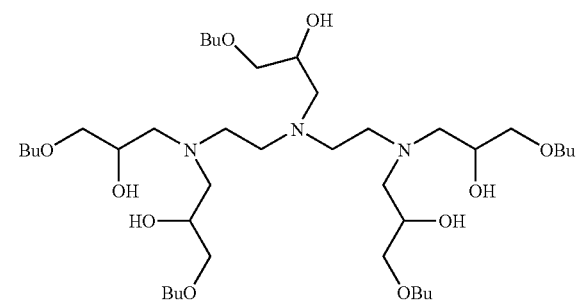

Q025 MW 574.1

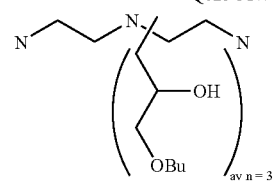

R048 MW av. 479.7

Imidazoles may be used and representative examples, include 2-heptadecyl-imidazole. Another imidazole weak base cationic surfactant is 2-coco-1-(2-hydroxy-ethyl)imidazole.

Pyridines may be used and representative compounds include 2-, 3- or 4-alkyl pyridines with the following structure:

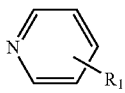

wherein $R_1$ a C6–16 alkyl.

For suitable anionic and weak base cationic surfactant classes, especially, cationic classes that include di- and higher amines and their ethoxylates, reference should be made to:

"Surfactants and Interfacial Phenomena", 2nd Ed. by Milton J. Rosen, published by Wiley Interscience 1989 New York, and "Cationic Surfactants: Organic Chemistry", James M. Richmond, published. by M. Dekker, New York 1990.

The amine surfactants form cationic species when added to water, and especially when the pH is adjusted by adding an acid.

Anionic surfactants are generally based upon sulfates, sulfonates, phosphates, or carboxylates and contain a water-soluble cation. A representative formula of a sulfonate is $R-SO_3M$ where R is a hydrocarbon group of from about 5 to 22 carbon atoms which may be linked through an alkoxy or oxyalkoxy to the sulfonate functionality and M is a water-soluble cation such as an alkali metal. Anionic surfactants include:

Alkyl ether sulfates (AES): $R(EO)_mSO_4^-$ (m is EO #)
Alkyl sulfates and sulfonates: $RSO_4^-$, $RSO_3^-$
Alkyl carboxylates: $RCOO^-$, such as $C_7H_{15}COO^-$
Alkyl phenyl ether sulfates, such as nonyl phenyl ether sulfates (NPE):
$C_9H_{19}Ph(OC_2H_4)_mOSO_3^-$ where R is as defined above.

Anionic surfactants include sodium salts of alkyl poly(oxyethylene) sulfonates and sodium salts of alkyl benzyl sulfonate, such as sodium salts of dodecylbenzyl sulfonate and sodium lauryl ether sulfate.

Another type of anionic surfactant is the anionic phosphate ester which is represented by the formula:

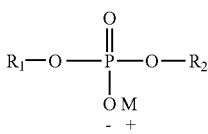

$R_1$=alkyl, aryl, ethoxylated alcohol, ethoxylated aryl, and the like,
$R_2$=hydrogen, M, alkyl, aryl, ethoxylated alcohol, ethoxylated aryl, and the like,
M=water-soluble cation such as sodium, ammonium, potassium, and the like.

An amount of the catanionic composition that is effective to reduce the equilibrium and/or dynamic surface tension of the water-based, inorganic or organic compound-containing composition is added. Such effective amount may range from 0.001 to 20 g/100 mL, preferably 0.01 to 5 g/100 mL and most preferably 0.05 to 1.5 g/100 mL, of the aqueous composition. Naturally, the most effective amount will depend on the particular application and the solubility of the catanionic composition.

The catanionic compositions are suitable for use in an aqueous composition comprising in water an inorganic compound which is, for example, a mineral ore or a pigment or an organic compound which is a pigment, an oligomeric resin, a polymeric resin, a herbicide, a fungicide, an insecticide, or a plant growth modifying agent.

In the following water-based organic coating, ink, adhesive, fountain solution and agricultural compositions containing a catanionic composition according to the invention, the other listed components of such compositions are those materials well known to the workers in the relevant art.

A typical water-based protective or decorative organic coating composition to which the catanionic composition of the invention may be added would comprise in an aqueous medium 30 to 80 wt % of a coating composition containing the following components:

| Water-Based Organic Coating Composition |
| --- |
| 0 to 50 wt % Pigment Dispersant/Grind Resin |
| 0 to 80 wt % Coloring Pigments/Extender Pigments/Anti-Corrosive Pigments/Other Pigment Types |
| 5 to 99.9 wt % Water-Borne/Water-Dispersible/Water-Soluble Resins |
| 0 to 30 wt % Slip Additives/Antimicrobials/Processing Aids/Defoamers |
| 0 to 50 wt % Coalescing or Other Solvent |
| 0.01 to 10 wt % Surfactant/Wetting Agent/Flow and Leveling Agents |
| 0.01 to 5 wt % Catanionic Composition |

A typical water-based ink composition to which the catanionic composition of the invention may be added would comprise in an aqueous medium 20 to 60 wt % of an ink composition containing the following components:

| Water-Based Ink Composition |
| --- |
| 1 to 50 wt % Pigment |
| 0 to 50 wt % Pigment Dispersant/Grind Resin |
| 0 to 50 wt % Clay base in appropriate resin solution vehicle |
| 5 to 99.9 wt % Water-Borne/Water-Dispersible/Water-Soluble Resins |
| 0 to 30 wt % Coalescing or Other Solvent |
| 0.01 to 10 wt % Surfactant/Wetting Agent |
| 0.01 to 10 wt % Processing Aids/Defoamers/Solubilizing Agents |
| 0.01 to 5 wt % Catanionic Composition |

A typical water-based agricultural composition to which the catanionic composition may be added would comprise in an aqueous medium 0.01 to 80 wt % of an agricultural composition containing the following components:

| Water-Based Agricultural Composition |
| --- |
| 0.1 to 50 wt % Pesticide, Insecticide, Herbicide or Plant Growth Modifying Agent |
| 0.01 to 10 wt % Surfactant |
| 0 to 5 wt % Dyes |
| 0 to 20 wt % Thickeners/Stabilizers/Co-surfactants/Gel Inhibitors/Defoamers |
| 0 to 25 wt % Antifreeze |
| 0.01 to 50 wt % Catanionic Composition |

A typical water-based fountain solution composition to which the catanionic composition may be added would comprise in an aqueous medium 30 to 70 wt % of a fountain solution composition containing the following components:

| Water-Based Fountain Solution | |
|---|---|
| 0.05 to 10 wt % | Film Formable, Water Soluble Macromolecule |
| 1 to 25 wt % | Alcohol, Glycol, or C2–C12 Polyol, Water Soluble or Water Solubilizable |
| 0.01 to 20 wt % | Water Soluble Organic Acid, Inorganic Acid, or a Salt Thereof |
| 0.01 to 5 wt % | Catanionic Composition |

A typical water-based adhesive composition to which the catanionic composition may be added would comprise in an aqueous medium 30 to 65 wt % of an adhesive composition containing the following components:

| Water-Based Adhesive Composition | |
|---|---|
| 50 to 99 wt % | Polymeric Resin (SBR, VAE, Acrylic) |
| 0 to 50 wt % | Tackifier |
| 0 to 0.5 wt % | Defoamer |
| 0.5 to 2 wt % | Catanionic Composition |

Unless otherwise specified, in the following Examples, aqueous solutions of the specified catanionic mixtures were prepared by simple stirring of the appropriate 1:1 molar mixture of cationic and anionic materials, accounting for the activity of the species present. Table A identifies materials used in the Examples.

TABLE A

| Chemical Name | Abbreviation | Idealized Chemical Formula |
|---|---|---|
| Anionic Materials | | |
| Sodium Octanoate | SOT | $CH_3(CH_2)_6COO^-Na^+$ |
| Sodium Xylene Sulfonate | SXS | $(CH_3)_2C_6H_3SO_3^-Na^+$ |
| Sodium Octyl Sulfate | SOS | $CH_3(CH_2)_7OSO_3^-Na^+$ |
| Sodium Lauryl Sulfate | SLS or Avirol | $CH_3(CH_2)_{11}OSO_3^-Na^+$ |
| Sodium Hexylsulfonate | SHS | $CH_3(CH_2)_5OSO_3^-Na^+$ |
| Sodium Dodecyl Ethoxylate Sulfate or Na Lauryl 2EO sulfate | SDE2S or Texapon-NSO | $C_{12}H_{25}(OC_2H_4)_2OSO_3^-Na^+$ |
| Ammonium Dodecyl Ethoxylate Sulfate | ADE12S or FES 993 | $C_{12}H_{25}(OC_2H_4)_{12}OSO_3^-NH_4^+(Na^+)$ |
| Sodium Dodecyl Ethoxylate Sulfate or Na Lauryl 4EO Sulfate | FES 32 | $C_{12}H_{25}(OCH_2CH_2)_4OSO_3^-Na^+$ |
| Cationic Materials | | |
| Dodecyltrimethyl ammonium chloride | DTAC | $CH_3(CH_2)_{11}N(CH_3)_3^+Cl^-$ |
| Amine Cationic Materials | | |
| DETA-MIBK2 | | Di-branched hexyl diethylenetriamine |
| DETA-MIAK2 | | Di-branched heptyl diethylenetriamine |
| N-2-(4-methyl)-pentyl-1-amino-ethylpiperazine | AEP-MIBK1 | Branched-hexyl Aminoethyl-piperazine |

TABLE A-continued

| Chemical Name | Abbreviation | Idealized Chemical Formula |
|---|---|---|
| N,N,N',N',N"-penta-(butoxyhydroxy-ethyl)diethylene-triamine | Q025 | See figure |
| N-butoxyhydroxy-ethyl substituted diethylenetriamine (av 3:1) | R048 | See figure |
| Nonionic Materials | | |
| Surfynol 104 | S-104 | Acetylenic diol |

Polystep B-20 (30 wt % active)—ADE30S from Stepan Co.
Polystep B-22 (30 wt % active)—SDE12S from Stepan Co.
Polystep B-29 (32 wt % active)—SOS from Stepan Co.
Arquad 12–37W (37 wt % active)—DTAC from Akzo Nobel
Aerosol OT—Dioctyl sodium sulfosuccinate (DOSS) from Cytec, MW 445

Cognis Surfactants
Avirol SL 2010—Sodium lauryl sulfate (C12—$OSO_3^-$ $Na^+$)—, MW 256
Sulfopon O 680—Sodium oleyl sulfate (C18—$OSO_3^-$ $Na^+$)—, MW 340
Texapon NSO—Sodium lauryl ether sulfate, C12—$EO_2$— $SO_3^-Na^+$—, (SDE2S), MW 359
Texapon FES 32 IS—Sodium lauryl ether sulfate, C12— $EO_4$—$SO_3^-Na^+$, MW 447
Disponil FES 993 IS—Sodium lauryl ether sulfate, C12— $EO_{12}$—$SO_3^-Na^+$, MW 755
DETA-MIBK2—reductive alkylation product of diethylenetriamine and methyl isobutyl ketone, i.e., N,N"-bis-(1,3-dimethylbutyl) diethylenetriamine also known as 2,4,12,14-tetramethyl-5,8,11-triazapentadecane, prepared according to U.S. Pat. No. 5,939,476.
DETA-MIAK2—reductive alkylation product of diethylenetriamine and methyl isoamyl ketone, i.e., N,N"-bis-(1,4-dimethylpentyl)diethylenetriamine also known as 2,5,13,16-tetramethyl-6,9,12-triazaheptadecane, prepared according to U.S. Pat. No. 5,939,476.
AEP-MIBK1—reductive alkylation product of aminoethylpiperazine and methyl isobutyl ketone, i.e., N-(1,3-dimethylbutyl)-N'-2-(2-amino)ethylpiperazine, prepared according to U.S. Pat. No. 6,235,820.
R048, Q025—3:1 (average) and 5:1 condensates of butyl glycidyl ether with diethylenetriamine, prepared according to Ser. No. 09/909,555 filed 20 Jul. 2001.

In the following Examples dynamic surface tension data were obtained for aqueous solutions of various compounds using the maximum bubble pressure method at bubble rates from 0.1 bubbles/second (b/s) to 20 b/s on the Kruss BP2 bubble pressure tensiometer. The DST of water is 72±1 dyne/cm at all bubble rates. These data provide information about the performance of a surfactant at conditions from near-equilibrium (0.1 b/s) through extremely high surface creation rates (20 b/s). In practical terms, high bubble rates correspond to high printing speeds in lithographic printing, high spray or roller velocities in coating applications, and rapid application rates for agricultural products.

EXAMPLE 1

This example shows the synergistic performance of weak base cationic and anionic surfactant blends.

Pseudo-equilibrium surface tension data were obtained for aqueous solutions of 0.015 M cationic, 0.015 M anionic and 0.015 M of their 1:1 molar mix using the maximum bubble pressure method at bubble rates from 0.1 bubbles/second (b/s) to 20 b/s. The complex was made by mixing equal volumes of 0.03M solutions of cationic with 0.03M solution of anionic surfactant, adjusting to pH 7 and diluting to 0.015M in total surfactant. Table 1 presents the 0.1 b/s (pseudo equilibrium) surface tension data for several surfactants and their 1:1 mixture, all at pH 7.

TABLE 1

| Single Surfactants 1.5 mM at pH 7 | Dyne/cm @ 0.1 b/s |
|---|---|
| Anionics | |
| SOT | |
| FES 993 | 43.6 |
| FES 32 | 44.6 |
| Sulfopon | 46.1 |
| DOSS | 35.9 |
| Texapon NSO | 43.1 |
| Avirol | 54.5 |
| Cationics | |
| Q025 | 34.7 |
| R048 | 42.1 |
| AEP/MIBK1 | 69.6 |
| DETA/MIBK2 | 71.0 |
| 1:1 Molar Surfactant Blends | |
| DETA/MIBK2-DOSS | 39.8 |
| AEP/MIBK1-Texapon NSO | 21.8 |
| AEP/MIBK1-Avirol 2010 | 32.0 |
| AEP/MIBK1-DOSS | 23.2 |
| Q025-FES 993 | 27.5 |

Note that the 0.1 b/s surface tensions of the catanionic blends are lower than the surface tensions of either component.

EXAMPLE 2

The versatility of anionic and cationic surfactant blends were also examined in terms of the influence of pH and stoichiometry on surface tension. Table 2 shows the changes in pseudo equilibrium surface tension of complexes based on DETA/MIBK2 with FES 993 and Sulfopon as a function of pH and ratio. The above surfactants as 0.03M solutions were blended at 2:1, 1:1, and 1:2 molar ratios, the pH was adjusted to pH 3.5, 7, and 10 and the solutions were diluted to 1.5 mM in total surfactant. Surface tensions were measured as above and are shown in Table 2 which shows the limiting (pseudo-equilibrium) surface tensions (0.1 bps) at 1.5 mM total surfactant concentration.

TABLE 2

| Catanionic Blend | Molar blend ratio | Surface Tension, dyne/cm | | |
|---|---|---|---|---|
| | | pH 3.5 | pH 7 | pH 10 |
| DETA/MIBK2:FES 993 | 1:1 | 33.2 | 33.5 | 33.4 |
| | 1:2 | 32.5 | 32.9 | 32.2 |
| | 2:1 | 34.2 | 34.6 | 31.9 |
| DETA/MIBK2:FES 32 | 1:1 | 38.3 | 25.7 | 30.3 |
| | 1:2 | 31.7 | 25.2 | 30.3 |
| | 2:1 | 40.0 | 28.7 | 30.4 |
| DETA/MIBK2:Sulfopon | 1:1 | 51.5 | 47.0 | 43.4 |
| | 1:2 | 48.7 | 43.2 | 41.1 |
| | 2:1 | 56.1 | 48.1 | 42.4 |

The results show surprisingly that weak base cationic/anionic surfactant blends in general give better surface tension reduction than the individual components and largely maintain that performance under acidic or basic pH and in a wide range of off-stoichiometric ratios (DETA/MIBK2 has three nitrogens, indicating that the stoichiometric blend is 1:3 for these systems). These data show that anionic and cationic surfactant blends were very robust: even using different pHs and stoichiometries, the EST remained very low. Table 2 shows that stoichiometries up to a 6:1 ratio (2:1 molar) had little influence on the DST behavior of the complexes. These data indicate that surfactant complexes close to 1:1 stoichiometry appear to dominate at interfaces even when bulk concentrations are skewed, probably due to the strong ionic interactions between the surfactants. This result is significant in expanding the numbers of useful anionic and cationic surfactant complexes. Specifically, the complexes that are water insoluble at stoichiometric ratios but dissolve in water as the stoichiometric is skewed from 1:1 ratio would find applications in coating and detergent industries.

EXAMPLE 3

Many other combinations of different strong acid anionic and both weak base and prior art strong base cationic compounds were prepared and their dynamic surface tensions were measured using the procedure of Example 1. Table 3A shows the DST for the individual anionic and strong and weak base cationic compounds. Table 3B illustrates that many of those complexes possessed the ability to lower the surface tension to below 45 dyne/cm at a concentration of $\leq 5$ wt % in water and a surface creation rate corresponding to 20 b/s, while others did not. Note that many of the examples were prepared as molar ratios, rather than the preferred stoichiometric ratios, but still show good DST values.

TABLE 3A

| Materials | Dynamic Surface Tension (dyne/cm) | | | |
|---|---|---|---|---|
| (0.01 M or 0.03 M*) | 0.1 b/s | 1 b/s | 10 b/s | 20 b/s |
| SXS | 71.2 | 71.8 | 72.4 | 72.8 |
| SHS | 70.8 | 71.0 | 71.5 | 71.6 |
| SLS | 24.7 | 50.6 | 65.6 | 66.8 |
| SOT | 69.8 | 70.2 | 71.0 | 71.0 |
| Texapon NSO* | 35.2 | 38.6 | 46.2 | 48.1 |
| Sulfopon* | 38.6 | 47.2 | 61.2 | 63.7 |
| Texapon FES 993* | 39.6 | 42.0 | 47.4 | 49.2 |
| Polystep B-27 SNPE4S | 34.9 | 37.6 | 46.4 | 49.3 |
| DTAC | 45.4 | 46.0 | 47.7 | 48.7 |
| Weak base surfactants | | | | |
| DETA/MIBK2* | 71.0 | 71.4 | 71.8 | |
| AEP/MIBK1* | 69.5 | 69.9 | 69.6 | |
| AEP/MIBK1* pH 10.5 | 46.1 | | | |
| R048* | 42.0 | 46.7 | 56.9 | 59.1 |
| Q025* | 34.7 | 36.5 | 41.5 | 44.1 |

TABLE 3B

| Complexes | Dynamic Surface Tension (dyne/cm) | | | |
|---|---|---|---|---|
| (0.01 M or 0.03 M*) (Anion/Cation) | 0.1 b/s | 1 b/s | 10 b/s | 20 b/s |
| DTAC/SOT 2:1 | 27.6 | 29.3 | 33.0 | 35.6 |
| DTAC/SOT 1:1 | 26.4 | 28.0 | 31.8 | 34.4 |

TABLE 3B-continued

| Complexes (0.01 M or 0.03 M*) (Anion/Cation) | Dynamic Surface Tension (dyne/cm) | | | |
|---|---|---|---|---|
| | 0.1 b/s | 1 b/s | 10 b/s | 20 b/s |
| DTAC/SOT 1:2 | 25.1 | 26.8 | 31.2 | 34.6 |
| DTAC/SOT 1:3 | 26.0 | 28.2 | 34.1 | 37.8 |
| AEP/MIBK1:Texapon 1:1* | 26.9 | 32.1 | 45.5 | 48.8 |
| AEP/MIBK1:Texapon 1:2* | 25.6 | 31.0 | 40.8 | 44.0 |
| AEP/MIBK1:Disponil FES 993 1:1* | 33.7 | 36.4 | 43.3 | 44.9 |
| AEP/MIBK1:Sulfopon 1:1* | 31.5 | 42.5 | 53.4 | 54.7 |
| R048:Texapon 1:1* | 25.1 | 30.6 | 35.1 | 36.9 |
| R048:Disponil FES 993 1:1* | 24.5 | 29.9 | 34.2 | 35.8 |
| R048:Sulfopon 1:1* | 28.8 | 33.9 | 38.3 | 37.1 |
| AEP/MIBK1:Texapon 1:1 (0.11 wt %) | 21.8 | 38.6 | 60.5 | 67.9 |
| AEP/MIBK1:Texapon 1:1 (0.875 wt %) | 27.2 | 32.8 | 49.1 | 49.5 |
| AEP/MIBK1:Texapon 1:1 (1.75 wt %) | 26.8 | 32.1 | 45.5 | 48.8 |

Usually, the complexes with longer alkyl chains tend to generate lower surface tension, and ethoxylation increases surface tension. Some pairs have the ability to lower the dynamic surface tension.

EXAMPLE 4

Foam formation and the influence of pH on foam dissipation was investigated using the 1:1 cationic/anionic surfactant pairs with a procedure based upon ASTM D 1173-53. In this test, a 0.1 wt % solution of the surfactant is added from an elevated foam pipette to a foam receiver containing the same solution. The foam height is measured at the completion of the addition ("Initial Foam Height") and the time required for the foam to dissipate at the air-liquid interface is recorded. This test provides a comparison between the foaming characteristics of various surfactant solutions. In general, in coatings, inks, and agricultural formulations, foam is undesirable because is complicates handling and can lead to coating and print defects, and to inefficient application of agricultural materials.

On the other hand, many surfactant pairs have been observed to generate copious amount of long lasting foams, particularly those with long alkyl chains on both surfactants. These surfactant pairs can find values in shampoos and other applications.

The foam data is presented in Table 4 (0.003M total surfactant except for DOSS).

TABLE 4

| Surfactant | pH | Foam Height (cm) | |
|---|---|---|---|
| | | 0 s | 300 s |
| DOSS (0.1 wt %) | 7 | 4.0 | 3.0 |
| DOSS/Q025 1:1 | 7 | 1 | 0.8 |
| DOSS/DETA-MIBK 1:1 | 7 | 0 | 0 |
| DOSS/AEP-MIBK1 1:1 | 7 | 1.5 | 0 |
| DOSS | 4 | 8 | 5 |
| DOSS/Q025 1:1 | 4 | 1.2 | 0 |
| Texapon/AEP-DETA | 7 | 0.9 | 0.8 |

DOSS is widely used as a surfactant, but suffers from foam production. The addition of various weak base amine surfactants has a strong impact on reducing or totally eliminating that foam, both at pH 7 and at pH 4.

EXAMPLE 5

Strong acid anionic surfactants can be blended with weak base amine surfactants to form additional complexes that show low foam, both initially and at short time as shown in Table 5 which presents the Ross Miles foam results for 1:1 molar blends of weak base amine cationic and strong acid anionic surfactants at 0.003M and pH 7. Note, for instance, the differences in foam and foam dissipation for Texapon NSO, Texapon FES 32, Texapon FES 993 and Sulfopon as a function of the specific weak base amine cationic surfactant with which it is paired.

TABLE 5

| Surfactant Blend | Foam Height (cm) | |
|---|---|---|
| | 0 s | 300 s |
| DETA/MIBK2-Sulfopon | 4.5 | 2.2 |
| AEP/MIBK1-Sulfopon | 3.9 | 3.8 |
| R048-Sulfopon | 3 | 0.5 |
| DETA/MIBK2-Texapon NSO | 1 | 0.8 |
| AEP/MIBK1-Texapon NSO | 0.9 | 0.8 |
| R048-Texapon NSO | 4.3 | 1.8 |
| R048-FES 32 | 5 | 2.2 |
| DETA/MIBK2-FES 32 | 1 | 0.8 |
| AEP/MIBK1-FES 32 | 2.1 | 2.1 |
| DETA/MIBK2-FES 993 | 2 | 1.8 |
| Q025-FES 993 | 2.5 | 1.4 |
| AEP/MIBK1-FES 993 | 2 | 1.9 |
| R048-FES 993 | 3.3 | 2.1 |
| AEP/MIBK1-Avirol | 2.7 | 2.5 |
| AEP/MIBK1-Rhodapon | 4.2 | 3.8 |

EXAMPLE 6

Anionic surfactants can be blended with amine surfactants to form complexes that maintain surface activity over a wide range of pHs. In contrast, using the amine surfactants alone results in a loss of surface activity as the pH is lowered. The protonation of amine nitrogens increases the solubility of the surfactant in water, and therefore decreases its affinity to migrate to the interface. Using the concept of cationic/anionic surfactant pairs, anionic compounds are added to amine surfactants. The protonated amine present at low pH forms a catanionic complex with the anionic additive and maintains a surface activity.

This concept is illustrated on N,N"-bis-(1,3-dimethylbutyl)diethylenetriamine (DETA-MIBK2) (1) surfactant. Equilibrium surface tension (EST) data is shown in Table 6A as a function of equivalents of added HCl on DETA-MIBK2 and DETA-MIBK2 upon addition of three equivalents of anionic sodium octanoate (SOT) or sodium hexyl sulfonate (SHS). The pH was adjusted by addition of HCl. The dynamic surface tension (DST) data is shown in Table 6B as a function of equivalents of added HCl to give the complex: (1).nHCl/(SOT)$_3$ or (1).nHCl/(SHS)$_3$.

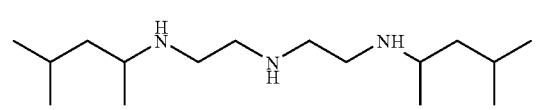

DETA-MIBK2 (1)

Table 6B shows the EST data for DETA-MIBK2 (1) compared to DETA-MIBK2/(SOT)$_3$ and DETA-MIBK2/(SHS)$_3$ with n=0–3 equivalents of HCl.

TABLE 6A

| Surfactants | Equilibrium Surface Tension (dyne/cm) | | | |
|---|---|---|---|---|
| | $n = 0$ | $n = 1$ | $n = 2$ | $n = 3$ |
| DETA-MIBK2.nHCl (0.01 M) | 30.0 | 37.6 | 67.9 | 68.5 |
| (1).nHCl/(SOT)$_3$ (0.02 M) | 32.4 | 33.7 | 30.5 | 27.9 |
| (1).nHCl/(SHS)$_3$ (0.02 M) | 29.4 | 31.6 | 35.2 | 35.9 |

The loss of surface activity was very obvious as HCl was added to solutions of DETA-MIBK2. The EST increased from 30 dynes/cm up to 68.5 dynes/cm, very close to the surface tension of water (72.1 dynes/cm). Addition of 3 equivalents of anionic compounds, SOT or SHS, was found to be effective in preventing loss of surface activity over a broad range of pH changes due to acidification with HCl. In all cases, the equilibrium surface tension was maintained below 40 dynes/cm.

The dynamic surface tension of (1).nHCl/(SOT)$_3$ was also retained upon addition of up to 3 equivalents of HCl as shown in Table 6B. The DST was in fact reduced to below 35 dynes/cm upon addition of 2 to 3 equivalents HCl.

TABLE 6B

| Surfactants | n (eq of HCl) | Dynamic Surface Tension (dyne/cm) | | | |
|---|---|---|---|---|---|
| | | 0.1 b/s | 1 b/s | 10 b/s | 20 b/s |
| (1).nHCl/(SOT)$_3$ | 0 | 38.8 | 40.1 | 41.9 | 43.2 |
| (1).nHCl/(SOT)$_3$ | 2 | 28.6 | 29.3 | 33.2 | 34.6 |
| (1).nHCl/(SOT)$_3$ | 3 | 29.1 | 29.5 | 32.3 | 32.1 |

Besides low surface tension, these complexes also show very low foam formation. Table 6C shows the foam height of 1:3 DETA-MIBK2:SOT at different pHs (adjusted with HCl) measured using ASTM D 1173-53 described in Example 4. Such complexes thus have desirable properties with respect to their use in coatings, inks and agricultural formulations.

TABLE 6C

| 1:3 DETA-MIBK2:SOT | Foam Height (cm) | | | |
|---|---|---|---|---|
| (0.1 wt %) pH | 0 s | 5 s | 30 s | 300 s |
| 10.6 | 0.9 | 0.3 | 0 | 0 |
| 8.8 | 2 | 0 | 0 | 0 |
| 5.6 | 0 | 0 | 0 | 0 |

Foam height of the dodecyltrimethylammonium bromide (DTAB) and sodium octanoate (SOT) blends were measured. The pH of the DTAB/SOT complex in solution is 6.56, while that of DTAB/SXS is 5.77. HCl and NaOH or NH$_4$OH were added to the complexes to adjust the pH. The above results compared with Table 6D show that, at least for SOT, the weak base amine is better at reducing foam than the strong base cationic surfactant DTAB.

TABLE 6D

| Surfactant | pH | Foam Height (cm) | |
|---|---|---|---|
| | | 0 s | 300 s |
| 1:1 DTAB/SOT (0.1 wt %) | 1.9 | 3.3 | 2.3 |
| 1:1 DTAB/SOT (0.1 wt %) | 6.6 | 2.1 | 1.2 |
| 1:1 DTAB/SOT (0.1 wt %) | 12.3 | 2.1 | 0.1 |

These complexes also show low dynamic surface tension and low foam as shown in Table 6B and 6C for 1:3 DETA-MIBK2:SOT.

EXAMPLE 7

Table 7 compares single surfactant pseudo-equilibrium surface tensions at a low 1.5 mM total surfactant concentration and pH 7 for a series of homologous long chain carboxylic acid surfactants with different weak base amine surfactants. None of the carboxylates show any significant surfactancy at pH 7, where they are largely protonated. The blend results show relatively modest reductions in surface tension, but a strong dependence on the balance of hydrophilicity and hydrophobicity of the specific pairs. Relatively hydrophilic AEP/MIBK1 works better with more hydrophobic carboxylic acids, while hydrophobic DETA/MIBK2 works better with more hydrophilic carboxylic acids.

TABLE 7

| Single Surfactants 1.5 mM at pH 7 | Dyne/cm @ 0.1 b/s |
|---|---|
| Anionics | |
| SOT-Octanoic acid (C8) | 70.3 |
| Decanoic acid (C10) | 71.5 |
| Lauric acid (C12) | 71.5 |
| Myrisitic acid (C14) | 72.0 |
| Stearic acid (C18) | 70.0 |
| Cationics | |
| Q025 | 34.7 |
| R048 | 42.1 |
| AEP/MIBK1 | 69.6 |
| DETA/MIBK2 | 71.0 |
| 1:1 Molar Surfactant Blends | |
| AEP/MIBK1-Octanoic acid | 70.7 |
| Q025-Octanoic acid | 37.2 |
| R048-Octanoic acid | 46.4 |
| AEP/MIBK1-Decanoic acid | 61.5 |
| DETA/MIBK2-Decanoic acid | 67.9 |
| AEP/MIBK1-Lauric acid | 56.7 |
| DETA/MIBK2-Lauric acid | 69.6 |
| AEP/MIBK1-Myrisitic acid | 55.8 |
| DETA/MIBK2-Myrisitic acid | 71.2 |
| AEP/MIBK1-Stearic acid | 72.0 |

The ability of a surfactant in aqueous systems to reduce surface tension under both equilibrium and dynamic conditions is of great importance in the performance of waterborne coatings, inks, adhesives, and agricultural formulations. Low equilibrium surface tension allows the development of excellent properties subsequent to application. Low dynamic surface tension results in enhanced wetting and spreading under the dynamic conditions of application, resulting in more efficient use of the formulations and fewer defects. In waterborne coatings, inks, adhesives, and agricultural formulations, the formation of foam is generally undesirable because it complicates handling and can cause defects or result in inefficient application.

The blends of many anionic and cationic surfactants display superior ability to lower equilibrium and dynamic surface tension than either component. Some of them, particularly those with long alkyl chains on both surfactants exhibit outstanding ability to provide equilibrium and dynamic surface tension reduction in aqueous formulations while producing copious quantities of long-lasting foam. This combination of characteristics may be of value in ore flotation and mining, carpet shampoos, dishwashing detergent, shaving cream, or other applications where the formation of foam is of practical or aesthetic importance, however, the same properties can be a significant negative in many other applications, such as the application of aqueous organic coating, ink, adhesive, fountain solution and agricultural compositions.

In contrast, the complex of protonated DETA-MIBK2 and other weak base amine surfactants, especially those with highly branched structures combined with sodium octanoate and other anionic surfactants display an excellent ability to reduce equilibrium and dynamic surface tension while producing substantially no foam.

STATEMENT OF INDUSTRIAL APPLICATION

The invention provides compositions suitable for reducing the equilibrium and dynamic surface tension and foaming in water-based coating, ink, adhesive, fountain solution and agricultural compositions.

We claim:

1. In a method for applying a coating of a water-based composition to a surface to partially or fully coat the surface, the composition containing an inorganic or organic compound and an effective amount of a surfactant for reducing the dynamic surface tension of the composition, the improvement which comprises employing as the surfactant a mixture of an anionic surfactant and a weak base cationic surfactant having a $pK_a$ less than 11.5 and being an amine surfactant selected from the group consisting of $R_1R_2N—R_3$, $R_1R_2N—R'_1—NR_3R_4$ where $R_1$ is C4–18 alkyl, hydroxyalkyl, alkoxyalkyl or hydroxyalkoxyalkyl, and each of $R_2$, $R_3$, and $R_4$ is independently H, C1–10 alkyl, C1–10 hydroxyalkyl, C1–10 hydroxy-alkoxyalkyl, benzyl or —$(C_2H_4O)_nH$ where n has a value from 1 to 14, and not more than one of $R_2$, $R_3$, and $R_4$ is benzyl, and $R'_1$ is a linking chain of 2–6 carbons, 2–6 carbons and an ether oxygen, or is two linking chains, such that N—$R'_1$—N is a piperazine ring;

$R_1R_2N—R'_1—(NR_5—R'_2)_r—NR_3R_4$ where $R_1$ is C4–18 alkyl, hydroxyalkyl, alkoxyalkyl or hydroxyalkoxyalkyl, and each of $R_2$, $R_3$, and $R_4$ is independently H, C1–10 alkyl, C1–10 hydroxyalkyl, C1–10 hydroxy-alkoxyalkyl, benzyl or —$(C_2H_4O)_nH$ where n has a value from 1 to 14, and not more than one of $R_2$, $R_3$, and $R_4$ is benzyl, and $R'_1$ is a linking chain of 2–6 carbons, 2–6 carbons and an ether oxygen, or is two linking chains, such that N—$R'_1$—N is a piperazine ring, $R'_2$ is a C2–3 chain, r is 1–2 and $R_5$ is H, C1–10 alkyl, C1–10 hydroxyalkyl, C1–10 hydroxy-alkoxyalkyl, benzyl or —$(C_2H_4O)_nH$ where n has a value from 1 to 14, and not more than one of $R_2$, $R_3$, $R_4$ and $R_5$ is benzyl; and $R_6$—HN$(CH_2)_2$[O$(CH_2)_n$]$_m$O$(CH_2)_q$NH—$R_7$ where n is 2–6, m is 0–4, and q is 2–6, and $R_6$ and $R_7$ independently are an alkyl group comprising 5 to 18 carbons;

where the ratio of carbon atoms to nitrogen plus ether and hydroxy oxygen atoms (C:N+O) in the weak base cationic surfactant is 2.5:1 to 10:1, an amount in moles of the mixture demonstrating a dynamic surface tension (DST) which is less than the DST of the same amount in moles of the individual anionic and weak base cationic surfactants, and less than 45 dynes/cm at a concentration of ≦5 wt % in water at 23° C. and 20 bubbles/second or less than 40 dynes/cm at a concentration of ≦0.03M in water at 23° C. and 0.1 bubbles/second according to the maximum-bubble pressure method.

2. The method of claim 1 in which the DST of the catanionic mixture is less than 35 dynes/cm at a concentration of ≦5 wt % in water at 23° C. and 20 bubbles/second.

3. The method of claim 1 in which the DST of the catanionic mixture is less than 40 dynes/cm at a concentration of ≦0.0015M in water at 23° C. and 0.1 bubbles/second.

4. The method of claim 1 in which the water-based composition is selected from the group consisting of aqueous organic coating, ink, adhesive, fountain solution and agricultural compositions.

5. The method of claim 1 in which the weak base cationic surfactant has a $pK_a$ less than 11.25.

6. The method of claim 1 in which both the anionic and weak base cationic surfactants are in a cationic to anionic surfactant equivalents ratio of 10:1 to 1:6.

7. The method of claim 1 in which the anionic surfactant is selected from the group consisting of organic sulfates, organic sulfonates, organic phosphates and organic carboxylates.

8. The method of claim 1 in which the weak base cationic surfactant is represented by either of the formulas:

$R_1R_2N—R_3$, or $R_1R_2N—R'_1—NR_3R_4$ where $R_1$ is C4–18 alkyl, hydroxyalkyl, alkoxyalkyl or hydroxyalkoxyalkyl, and each of $R_2$, $R_3$, and $R_4$ is independently H, C1–10 alkyl, C1–10 hydroxyalkyl, C1–10 hydroxy-alkoxyalkyl, benzyl or —$(C_2H_4O)_nH$ where n has a value from 1 to 14, and not more than one of $R_2$, $R_3$, and $R_4$ is benzyl, and $R'_1$ is a linking chain of 2–6 carbons, 2–6 carbons and an ether oxygen, or is two linking chains, such that N—$R'_1$—N is a piperazine ring.

9. The method of claim 1 in which the weak base cationic surfactant is represented by the formula:

$R_1R_2N—R'_1—(NR_5—R'_2)_r—NR_3R_4$ where $R_1$ is C4–18 alkyl, hydroxyalkyl, alkoxyalkyl or hydroxyalkoxyalkyl, and each of $R_2$, $R_3$, and $R_4$ is independently H, C1–10 alkyl, C1–10 hydroxyalkyl, C1–10 hydroxy-alkoxyalkyl, benzyl or —$(C_2H_4O)_nH$ where n has a value from 1 to 14, and not more than one of $R_2$, $R_3$, and $R_4$ is benzyl, and $R'_1$ is a linking chain of 2–6 carbons, 2–6 carbons and an ether oxygen, or is two linking chains, such that N—$R'_1$—N is a piperazine ring, $R'_2$ is a C2–3 chain, r is 1–2 and $R_5$ is H, C1–10 alkyl, C1–10 hydroxyalkyl, C1–10 hydroxyalkoxyalkyl, benzyl or —(C$_2$H$_4$O)$_n$H where n has a value from 1 to 14, and not more than one of R$_2$, R$_3$, R$_4$ and R$_5$ is benzyl.

10. The method of claim 1 in which the weak base cationic surfactant is represented by the formula:

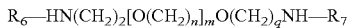

where n is 2–6, m is 0–4, and q is 2–6, and R$_6$ and R$_7$ independently are an alkyl group comprising 5 to 18 carbons.

11. An aqueous composition comprising in water an inorganic compound which is a mineral ore or a pigment or an organic compound which is a pigment, an oligomeric resin, a polymeric resin, a herbicide, an insecticide, or a plant growth modifying agent and an effective amount of a catanionic surfactant mixture for reducing the dynamic surface tension of the composition, the catanionic surfactant mixture comprising an anionic surfactant and a weak base cationic surfactant having a pK$_a$ less than 11.5 and being an amine surfactant selected from the group consisting of

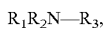

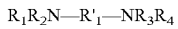

where R$_1$ is C4–18 alkyl, hydroxyalkyl, alkoxyalkyl or hydroxyalkoxyalkyl, and each of R$_2$, R$_3$, and R$_4$ is independently H, C1–10 alkyl, C1–10 hydroxyalkyl, C1–10 hydroxy-alkoxyalkyl, benzyl or —(C$_2$H$_4$O)$_n$H where n has a value from 1 to 14, and not more than one of R$_2$, R$_3$, and R$_4$ is benzyl, and R'$_1$ is a linking chain of 2–6 carbons, 2–6 carbons and an ether oxygen, or is two linking chains, such that N—R'$_1$—N is a piperazine ring;

where R$_1$ is C4–18 alkyl, hydroxyalkyl, alkoxyalkyl or hydroxyalkoxyalkyl, and each of R$_2$, R$_3$, and R$_4$ is independently H, C1–10 alkyl, C1–10 hydroxyalkyl, C1–10 hydroxy-alkoxyalkyl, benzyl or —(C$_2$H$_4$O)$_n$H where n has a value from 1 to 14, and not more than one of R$_2$, R$_3$, and R$_4$ is benzyl, and R'$_1$ is a linking chain of 2–6 carbons, 2–6 carbons and an ether oxygen, or is two linking chains, such that N—R'$_1$—N is a piperazine ring, R'$_2$ is a C2–3 chain, r is 1–2 and R$_5$ is H, C1–10 alkyl, C1–10 hydroxyalkyl, C1–10 hydroxyalkoxyalkyl, benzyl or —(C$_2$H$_4$O)$_n$H where n has a value from 1 to 14, and not more than one of R$_2$, R$_3$, R$_4$ and R$_5$ is benzyl; and

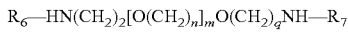

where n is 2–6, m is 0–4, and q is 2–6, and R$_6$ and R$_7$ independently are an alkyl group comprising 5 to 18 carbons;

where the ratio of carbon atoms to nitrogen plus ether and hydroxy oxygen atoms (C:N+O) in the weak base cationic surfactant is 2.5:1 to 10:1, the weak base cationic and anionic surfactants in an equivalents ratio of 10:1 to 1:6, an amount in moles of the surfactant mixture demonstrating a dynamic surface tension (DST) which is less than the DST of the same amount in moles of the individual anionic and weak base cationic surfactants and less than 45 dynes/cm at a concentration of ≦5 wt % in water at 23° C. and 20 bubbles/second or less than 40 dynes/cm at a concentration of ≦0.03M in water at 23° C. and 0.1 bubbles/second according to the maximum-bubble pressure method.

12. The aqueous composition of claim 11 in which the DST of the catanionic mixture is less than 35 dynes/cm at a concentration of ≦5 wt % in water at 23° C. and 20 bubbles/second.

13. The aqueous composition of claim 11 in which the DST of the catanionic mixture is less than 40 dynes/cm at a concentration of ≦0.0015M in water at 23° C. and 0.1 bubbles/second.

14. The aqueous composition of claim 11 in which the weak base cationic surfactant has a pK$_a$ less than 11.25.

15. The aqueous composition of claim 11 in which the anionic and weak base cationic surfactants are in a cationic to anionic surfactant equivalent ratio of 3:1 to 1:2.

16. The aqueous composition of claim 11 in which the anionic surfactant is selected from the group consisting of organic sulfates, organic sulfonates, organic phosphates and organic carboxylates.

17. The aqueous composition of claim 11 in which the anionic surfactant is selected from the group consisting of weak acid organic carboxylates.

18. The method of claim 11 in which the weak base cationic surfactant is represented by either of the formulas:

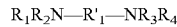

where R$_1$ is C4–18 alkyl, hydroxyalkyl, alkoxyalkyl or hydroxyalkoxyalkyl, and each of R$_2$, R$_3$, and R$_4$ is independently H, C1–10 alkyl, C1–10 hydroxyalkyl, C1–10 hydroxy-alkoxyalkyl, benzyl or —(C$_2$H$_4$O)$_n$H where n has a value from 1 to 14, and not more than one of R$_2$, R$_3$, and R$_4$ is benzyl, and R'$_1$ is a linking chain of 2–6 carbons, 2–6 carbons and an ether oxygen, or is two linking chains, such that N—R'$_1$—N is a piperazine ring.

19. The aqueous composition of claim 11 in which the weak base cationic surfactant is represented by the formula:

where R$_1$ is C4–18 alkyl, hydroxyalkyl, alkoxyalkyl or hydroxyalkoxyalkyl, and each of R$_2$, R$_3$, and R$_4$ is independently H, C1–10 alkyl, C1–10 hydroxyalkyl, C1–10 hydroxy-alkoxyalkyl, benzyl or —(C$_2$H$_4$O)$_n$H where n has a value from 1 to 14, and not more than one of R$_2$, R$_3$, and R$_4$ is benzyl, and R'$_1$ is a linking chain of 2–6 carbons, 2–6 carbons and an ether oxygen, or is two linking chains, such that N—R'$_1$—N is a piperazine ring R'$_2$ is a C2–3 chain, r is 1–2 and R$_5$ is H, C1–10 alkyl, C1–10 hydroxyalkyl, C1–10 hydroxyalkoxyalkyl, benzyl or —(C$_2$H$_4$O)$_n$H where n has a value from 1 to 14, and not more than one of R$_2$, R$_3$, R$_4$ and R$_5$ is benzyl.

20. The aqueous composition of claim 11 in which the weak base cationic surfactant is represented by the formula:

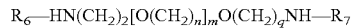

where n is 2–6, m is 0–4, and q is 2–6, and R$_6$ and R$_7$ independently are an alkyl group comprising 5 to 18 carbons.

21. The composition of claim 11 which is an aqueous organic coating composition comprising in water 30 to 80 wt % of a coating composition which comprises the following components 0 to 50 wt % pigment dispersant, grind resin or mixtures thereof;

0 to 80 wt % coloring pigment, extender pigment, anticorrosive pigment, other pigment types or mixtures thereof;

5 to 99.9 wt % water-borne, water-dispersible or water-soluble resin or mixtures thereof;

0 to 30 wt % slip additive, antimicrobial agent, processing aid, defoamer or mixtures thereof;

0 to 50 wt % coalescing or other solvent;

0.01 to 10 wt % surfactant, wetting agent, flow and leveling agents or mixtures thereof; and 0.01 to 20 wt % catanionic mixture.

22. The composition of claim 11 which is an aqueous ink composition comprising in water 20 to 60 wt % of an ink composition which comprises the following components 1 to 50 wt % pigment;

0 to 50 wt % pigment dispersant, grind resin or mixtures thereof;

0 to 50 wt % clay base in a resin solution vehicle;

5 to 99 wt % water-borne, water-dispersible or water-soluble resin or mixtures thereof;

0 to 30 wt % coalescing or other solvent;

0.01 to 10 wt % processing aid, defoamer, solubilizing agent or mixtures thereof;

0.01 to 10 wt % surfactant, wetting agent or mixtures thereof; and 0.01 to 20 wt % catanionic mixture.

23. The composition of claim 11 which is an aqueous agricultural composition comprising in water 0.01 to 80 wt % of an agricultural composition which comprises the following components 0.1 to 50 wt % a herbicide, insecticide, plant growth modifying agent or mixtures thereof;

0.01 to 10 wt % surfactant;

0 to 5 wt % dye;

0 to 20 wt % thickener, stabilizer, co-surfactant, gel inhibitor, defoaming agent or mixtures thereof;

0 to 25 wt % antifreeze; and 0.01 to 50 wt % catanionic mixture.

24. The composition of claim 11 which is an aqueous fountain solution composition comprising in water 30 to 70 wt % of an fountain solution composition which comprises the following components 0.05 to 10 wt % film formable, water soluble macromolecule;

1 to 25 wt % alcohol, glycol, or polyol with 2–12 carbon atoms which is water soluble or can be made water soluble;

0.01 to 20 wt % water soluble organic acid, inorganic acid, or a salt thereof;

0.01 to 5 wt % catanionic mixture.

25. The composition of claim 11 which is an aqueous adhesive composition comprising in water 30 to 65 wt % of an adhesive composition which comprises the following components 50 to 99 wt % polymeric resin;

0 to 50 wt % tackifier;

0 to 0.5 wt % defoamer; and 0.5 to 2 wt % catanionic mixture.

* * * * *